3,769,265
POLYURETHANES BASED ON TERTIARY ALCO-
HOL-MODIFIED NAPHTHYLENE - 1,5 - DIISO-
CYANATE
Gerhard Grögler, Leverkusen, Wilhelm Kallert, Cologne, and Ernst Meisert, Leverkusen-Steinbuchel, Germany, assignors to Bayer Aktiengesellschaft, Leverkusen, Germany
No Drawing. Filed Feb. 14, 1972, Ser. No. 226,263
Claims priority, application Germany, Feb. 18, 1971, P 21 07 678.8
Int. Cl. C08g 22/26
U.S. Cl. 260—75 NT    7 Claims

ABSTRACT OF THE DISCLOSURE

A process is provided for the production of polyurethane elastomers by reacting naphthylene-1,5-diisocyanate with a dihydroxy compound which has a molecular weight of 500 to 6,000 to produce a prepolymer which contains isocyanate groups and reacting the prepolymer with glycols, characterized in that a modified naphthylene-1,5-diisocyanate which contains 0.02 to 0.5 mol, preferably 0.1 to 0.25 mol, of urea groups or biuret groups per mol of naphthylene-1,5-diisocyanate is used.

---

The production of cross-linked synthetic resins from linear polyesters or polyethers, which mainly contain hydroxyl groups, by reacting the said polyesters or polyethers with an amount of organic diisocyanate in excess of that required for the reaction with the hydroxyl groups has been known for a long time. Linkage of the polyester or polyether chains via urethane groups takes place in this reaction and linear structures which contain free isocyanate groups at the ends of the chains are formed. The smaller the amount of diisocyanate which is in excess of the quantity required for the reaction with the hydroxyl groups, the higher is the molecular weight of these so-called linear polyesters or polyethers which contain isocyanate groups, and conversely. There are basically three processes available for converting the resulting polyesters or polyethers which contain isocyanate groups into high grade cross-linked synthetic resins.

The first process (see German patent specification No. 831,772) consists in reacting the isocyanate polyesters or polyethers with glycols. Chain lengthening via urethane groups takes place in the first stage of this reaction and additional isocyanate groups then contribute to the further cross-linking of the molecular in the second phase by reacting with the H atoms of the urethane groups to form allophanate bonds. This process enables the product to be worked up in the liquid phase and various moulded products to be produced by the casting process without the use of solvents.

In the second process, diamines are used instead of glycols and chain lengthening of the polyester or polyether which contains isocyanate groups is effected via two adjacent urea groups whose hydrogen atoms react with the isocyanate groups still present to form biuret bonds which result in cross-linking.

The third process consists in reacting the polyester or polyether which contains isocyanate groups with water, which results in the additional linking of two isocyanate groups by the formation of a urea linkage. A high molecular weight product is obtained in this way. In this process again the hydrogen atoms of the urea groups react with excess isocyanate groups to form biuret groups as transverse linkages. Since these biuret groups are more heat stable than the allophanate groups formed in the first process, the elastomers produced by the second and third process have better mechanical properties. This manifests itself especially in the structure, elasticity, residual compression deformation and abrasion resistance of the products. The third process has, however, the disadvantage that carbon dioxide is liberated in the reaction of the isocyanate groups with water so that the material cannot be worked up in the liquid phase owing to the formation of bubbles which this would entail. A technically complicated working up process is therefore necessary, in which the foamy polyurethane material is shaped by compression at high pressure.

This invention is based on the finding that novel, valuable cross-linked synthetic resins which have rubbery elastic properties are obtained if the urea groups required for the formation of the transverse biuret linkage are initially introduced via the polyisocyanate, in particular naphthylene-1,5-diisocyanate.

This invention therefore relates to a process for the production of polyurethane elastomers by reacting naphthylene-1,5-diisocyanate with a dihydroxy compound which has a molecular weight of from 500 to 6,000 to form a prepolymer which contains isocyanate groups and reacting the prepolymer with glycols, characterised in that a modified naphthylene-1,5-diisocyanate which contains 0.02 to 0.5 mol, preferably 0.1 to 0.25 mol, of urea or biuret groups per mol of naphthylene-1,5-diisocyanate is used.

This modified isocyanate may advantageously be prepared e.g. by heating naphthylene-1,5-diisocyanate with the appropriate quantity of tertiary alcohols such as tertiary butyl alcohol, e.g. to 130° C.

When tertiary butyl alcohol is used for the preparation of the modified isocyanate, the tertiary butyl urethane of naphthylene-1,5-diisocyanate first formed is decomposed by the heat with liberation of carbon dioxide and isobutene. The decomposition temperature can be substantially reduced by using catalysts such as hydrohalic acids or salts of bases which contain nitrogen and inorganic or organic acids, so that the modified naphthylene-1,5-diisocyanate obtained has a definite structure. When this modified naphthylene-1,5-diisocyanate is reacted with a linear polyester or polyether, the NCO prepolymer which contains urea or biuret groups is first formed and this may then be reacted with a further diol as chain extender. In this phase, the urethane groups as well as the urea groups which have already been incorporated may react with excess isocyanate groups still present to effect further cross-linking of the molecule. This reaction is also additive like the cross-linking reaction with glycols or diamines. The process according to the invention is therefore a combination of cross-linking with water and cross-linking with glycols or polyols, and the disadvantages of cross-linking with water are eliminated by the urea groups previously formed in the NCO prepolymer. The advantages of the new process over the process previously known reside in the fact that the cross-linking reaction between the NCO prepolymer obtained according to the invention and diols, in particular higher molecular weight diols (molecular weight 500 to 6,000) proceeds more rapidly owing to the activating effect of the urea and biuret groups already present in the polyisocyanate and that the cross-linked product can therefore be removed from the mould within a short time. The synthetic resins produced in this way are rubbery elastic products and they have superior mechanical properties comparable to those of polyurethane elastomers which have been cross-linked with water (process 3). The reaction velocity of the modified naphthylene diisocyanate prepolymers with diols may also be adjusted as required by the addition of acids or organic bases such as tertiary amines in known manner.

The proportion of reactants chosen for the reaction between the NCO prepolymer which contains urea and biuret groups and the low molecular weight or higher molecular weight diols is preferably such that the excess of NCO groups is not completely used up. The diols are therefore used in slightly less than the stoichiometric ratio. The NCO/OH ratio employed is generally between 1.02 and 1.20. Cross-linking may then be effected with simultaneous shaping of the product.

According to another procedure, the diols are used in equivalent proportion to the isocyanate groups present so that a linear structure is first formed into which 1 to 5% of a diisocyanate are then incorporated before the shaping process.

Any tertiary alcohols may be used for preparing the naphthylene-1,5-diisocyanate which contains urea or biuret groups, e.g. the tertiary alcohols mentioned in U.S. patent application Ser. No. 351,241, now U.S. Pat. 3,358,010, issued Dec. 12, 1967, such as tertiary butyl alcohol, 2-methyl-2-butanol, 2-methyl-2-pentanol, 3-methyl-3-pentanol, 3-ethyl-3-pentanol, 1-methyl-cyclohexanol, 1-ethyl-cyclohexanol and 1,1-dimethyl-allyl alcohol. The preferred alcohol is tertiary butyl alcohol. Usually 0.02 to 0.5 mol, preferably 0.1 to 0.25 mol of tertiary alcohol is reacted per mol of naphthylene-1,5-diisocyanate at temperatures of 125 to 145° C. The progress of the reaction can easily be followed and controlled by determining the volume of gas evolved. Catalysts such as acids or salts of bases which contain nitrogen and inorganic or organic acids are advantageously added to the reaction mixture, e.g. in amounts of 0.001 to 0.1 mol per mol of tertiary alcohol, in order to depress as much as possible the temperature at which pyrolysis of naphthylene-1,5-diisocyanate which is modified with tertiary butyl urethane takes place.

Preparation of the naphthylene-1,5-diisocyanate used according to the invention may, on the other hand, also be carried out e.g. by reacting naphthylene-1,5-diisocyanate with water or formic acid or hydrogen sulphide; this reaction also results in the formation of biuret or urea groups.

The modified naphthylene-1,5-diisocyanate used according to the invention is then reacted in known manner with a dihydroxy compound which has a molecular weight of 500 to 6,000, preferably 1,000 to 3,000, to produce a prepolymer which contains isocyanate groups. Suitable dihydroxy compounds are particularly the polyesters and polyethers known per se, for example polyethers which are obtained by reacting an alkylene oxide such as ethylene oxide, propylene oxide, epichlorohydrin or tetrahydrofuran either with itself or with initiator compounds. Suitable initiator compounds are e.g. water, polyols or polyamines. Suitable polyols are e.g. ethylene glycol, propylene glycol and butane diol, and examples of suitable polyamines are ethylene diamine and hexamethylenediamine. Polyethers which may be used according to the invention are mentioned e.g. in British patent specification No. 769,091, in German patent specification No. 974,371 and in U.S. patent specification Nos. 2,948,691 and 2,929,800.

Linear polyesters, which are the preferred starting materials for this invention, are best prepared from substantially saturated aliphatic products. The following acids are suitable: malonic acid, succinic acid, adipic acid, methyl adipic acid, maleic acid, carbonic acid, dihydromuconic acid, thiopropionic acid, diethylether dicarboxylic acid, sebacic acid, suberic acid and higher dicarboxylic acids. The following glycols are suitable: ethylene glycol, 1,2-propylene glycol, 1,3-propylene glycol, 1,3-butylene glycol, 1,4-butylene glycol, 1,6-hexanediol, methylhexane-1,6-diol, 1,4-dimethyl-1,3-propylene glycol. Hydroxycarboxylic acids may also be used for the preparation of polyesters, provided the tendency to polycondensation is greater than the tendency to ring closure and that sufficient quantities of glycol are present to ensure the formation of hydroxyl end groups. Mixtures of various acids and glycols may also be used, mixed polyesters being obtained in that case. Instead of acids and glycols, smaller quantities of other bifunctional reactants may be used, for example compounds which have aromatic nuclei, e.g. phthalic acid or terephthalic acid, aromatic or aliphatic diamines, e.g. phenylene diamines, naphthylene diamines, piperazine and ethylene diamine, or amino alcohols such as aminopropanol or hydroxyethylaniline. Polycondensation of the reactants is effected by heating at 100° C. to 250° C. The OH number of the polyesters should be between 20 and 100 if possible and preferably between 40 and 60, the molecular weight being then advantageously 500 to 6,000. The polyesters should if possible be freed from any moisture adhering to them before they are reacted with the isocyanate which contains urea or biuret groups, e.g. by heating them to 100° C. to 150° C. under vacuum or by passing inert gases through them within the said temperature range. The acid used as polyester component is preferably adipic acid and the glycols are preferably ethylene glycol and 1,2-propylene glycol.

It may often be preferred to use polycaprolactones as starting material for the process according to the invention, e.g. those described in U.S. patent specification Nos. 3,169,945; 2,914,556; 2,890,208 and 2,878,236 or in British patent specification No. 859,645.

According to one variation of the process, unmodified naphthylene-1,5-diisocyanate may first be reacted with the dihydroxy compound which has a molecular weight of 500 to 6,000 to produce an isocyanate prepolymer, modification with introduction of biuret and urea groups being carried out thereafter by the method described above, followed by further reaction with the cross-linking agent.

The isocyanate prepolymer is then chain lengthened or cross-linked by reacting it with glycols. The glycols used for this purpose have a molecular weight of from 62 to about 500. The following are given as examples: ethylene glycol, propylene glycol, butane-1,4-diol and butane-2,3-diol, hexane-1,6-diol, monochlorohydrin, glycerol monoalkyl or monoaryl ethers, xylylene glylcols and the Diels-Alder addition product of butenediol and anthracene. Butane-1,4-diol and butane-2,3-diol or the corresponding unsaturated derivatives, e.g. butenediol or butynediol are preferred. Cyclic glycols have also proved to be very suitable, e.g. quinitol or hexahydropyrocatechol.

Further details of the invention will be described in the examples which follow. The reaction velocity of the components may be increased by the addition of organic bases such as tertiary amines or metal salts of organic acids. The following are examples of the first of these two groups: hexahydrodimethylaniline, methylpiperazine, dimethylpiperazine, tribenzylamine and tetramethyldiamino-dipropylether. Similar effects are achieved by using polyesters which contain chemically bound basic reaction groups. The following are given as examples of metal salts of organic acids: tin (II) ethyl hexoate and dibutyl tin dilaurate. It is occasionally advisable for technical reasons to retard the NCO/OH reaction between the NCO prepolymers which contain urea and biuret groups and the highly reactive glycols. This may be achieved by adding small quantities of acid substances to the isocyanate modified polyester before reaction with glycols. The most important acid substance for this purpose is hydrogen chloride.

Sulphur dioxide, boric acid and organic acids have a similar effect. Products which decompose into compounds which are acid in reaction have also been found suitable for this purpose, e.g. butadiene sulphone which decomposes into butadiene and sulphur dioxide. Fillers which have an acid character, e.g. active charcoal which has been produced under acid reaction conditions, also have a reaction inhibiting effect.

Plasticisers, dyes and fillers can easily be added at any stage of the preparation. Suitable plasticisers are e.g. phthalic acid esters and organic sulphonamides. Plasticisers which contain sulphur have been found to be particularly suitable, e.g. the butyl ester of methylene-bis-thioglycollic acid. Some of the fillers bring about an improvement in the mechanical properties of the new rubbery elastic products in the same way as in natural rubber. This applies e.g. to titanium dioxide, silicon dioxide, bentonite, calcium silicate and carbon black. The fillers may be incorporated e.g. either with the polyesters or polyethers or with the NCO prepolymer which contains urea and biuret groups. The superior mechanical properties and excellent resistance to organic solvents and oils open up a wide field of application to the rubber elastic synthetic resins described above. The following are mentioned as examples of these applications: Roller covers, elastic parts for machines, seals, buffers, bellows, linings for ball mills, shoes or parts of shoes, balls, cylinders.

PREPARATION OF NAPHTHYLENE-1,5-DIISOCYANATES WHICH CONTAIN UREA AND BIURET GROUPS USED AS STARTING MATERIAL ACCORDING TO THE INVENTION 2,100 g. (10.0 mols) of naphthylene-1,5-diisocyanate are heated to 130° C. to 135° C. in a three-necked flask which is equipped with stirrer, thermometer and intensive cooling device. When the isocyanate has melted, 0.4 g. of a salt of toluene sulphonic acid and morpholine is added and 148 g. (2.0 mols) of tertiary butanol are added dropwise in the course of one hour. Vigorous evolution of carbon dioxide and isobutene sets in after only a few minutes of adding tertiary butanol. The volume of carbon dioxide and isobutene evolved may be measured with a gas meter. After a total of 2 hours, about 90 l. of gas have been liberated, which corresponds to a conversion of about 92% of the theoretical. When the melt has been poured out on to an enamelled sheet metal support, the cake of solidified melt, which rapidly cools, can easily be reduced in size or ground up. The NCO content of 30.2% signifies that about 50% of the urea groups originally formed have reacted with excess isocyanate groups of naphthylene - 1,5 - diisocyanate to form biuret groups. Several urea-containing and biuret-containing isocyanates which were prepared as described above are represented in the following table.

| Product | Mol of— Naphthylene-1,5-diisocyanate | Tertiary butanol | Percent NCO |
|---|---|---|---|
| A | 1.0 | 0.1 | 35.2 |
| B | 1.0 | 0.15 | 32.5 |
| C | 1.0 | 0.2 | 30.2 |
| D | 1.0 | 0.25 | 27.2 |
| E | 1.0 | 0.3 | 26.5 |

Example 1

(1a) 200 g. of a polyester of glycol and adipic acid with OH number 56 (=1.7% OH) are dehydrated at 130° C. and 12 mm. pressure. 56 g. of the modified isocyanate C are then introduced with stirring, a drop in reaction temperature to about 120° C. being initially observed. After about 10 minutes, when the temperature has risen again to 128° C., 165 g. of the polyester mentioned above are stirred in and the melt is poured into moulds which have been heated to 110° C. The product can be removed from the mould after 45 to 55 minutes, and a highly elastic polyurethane which has the physical properties shown below is obtained after 24 hours' reheating of the moulded product at 110° C.

| Test | Test standard | |
|---|---|---|
| Shore hardness A | DIN 53 505 | 63 |
| Tensile stength | DIN 53 504 | 280 kg. wt./cm.$^2$ |
| Elongation at break | DIN 53 504 | 700% |
| Load at— | | |
| 100% | DIN 53 504 | 19 kg. wt./cm.$^2$ |
| 300% | | 50 kg. wt./cm.$^2$ |
| Elongation | | |
| Tear propagation resistance (Graves) | DIN 53 515 | 60 kg. wt./cm. |
| Impact elasticity | DIN 53 512 | 56% |
| Permanent elongation | | 8% |
| Abrasion loss | DIN 53 516 | 40 mm.$^3$ |

(1b) If 42 g. of naphthylene-1,5-diisocyanate are used instead of 56 g. of the modified isocyanate C in Example 1(a) (according to the NCO equivalents, 1 g. of naphthylene-1,5-diisocyanate corresponds to 1.33 g. of product C), the moulded products cannot be removed from the mould even after 8 hours' heating at 110° C. because the activity of the NCO/OH reaction is too low. After continued heating, only a bubbly, foamy product which has poor mechanical properties is obtained.

Example 2

300 g. of a glycol-adipic acid polyester (OH number =56) are reacted with 97 g. of the modified isocyanate C in a manner analogous to Example 1(a). Cross-linking then takes place on addition of a mixture of 100 g. of the polyester mentioned above and 8 g. of butane-1,4-diol. After a casting time of about 3 minutes and a time in the mould of about 15 minutes, when the product is ready to be removed, a high grade material which has the following properties is obtained:

Shore hardness A _____ 73
Tensile strength, kg. wt./cm.$^2$ _____ 270
Elongation at break, percent _____ 540
Load at:
    100% elongation, percent _____ 32
    300% elongation, percent _____ 95
Tear propagation resistance, kg. wt./cm. _____ 54
Impact elasticity, percent _____ 50
Permanent elongation, percent _____ 8
Abrasion loss, mm.$^3$ _____ 48

When the modified isocyanate C mentioned above is replaced by 72 g. of naphthylene-1,5-diisocyanate, the product obtained is substantially harder (Shore hardness A=83).

Example 3

150 g. of a polyester of glycol and adipic acid with OH number 56 are reacted with 44.8 g. of the modified isocyanate D as described in Examples 1 and 2. After the addition of a mixture of 50 g. of the polyester mentioned above and 2 g. of butane-1,4-diol, a soft, highly elastic material which has the properties indicated below is obtained.

Shore hardness A _____ 68
Tensile strength, kg. wt./cm.$^2$ _____ 250
Elongation at break, percent _____ 500
Tear propagation resistance, kg. wt./cm. _____ 55
Impact elasticity, percent _____ 55
Permanent elongation, percent _____ 7
Abrasion loss, mm.$^3$ _____ 65

Example 4

78 g. of the modified isocyanate B are added at 130° C. to 300 g. of a linear polycarbonate based on hexane-1,6-diol and diphenylcarbonate (OH number=61). An additional 247.5 g. of the polycarbonate is added after 15 minutes and the melt is poured into moulds which have been heated to 100° C. After about 10 hours' tempering at 110° C., the elastomer has the following properties:

Shore hardness A _____ 67
Tensile strength, kg. wt./cm.$^2$ _____ 350
Elongation at break, percent _____ 500
Tear propagation resistance, kg. wt./cm. _____ 45
Impact elasticity, percent _____ 50
Permanent elongation, percent _____ 35

Example 5

200 g. of a polyester of adipic acid, ethylene glycol and butane-1,4-diol (OH number 55) are reacted with 57 g. of the modified isocyanate C and then with a further 165 g. of a polyester of glycol and adipic acid (see Example 1) as already described. The following properties are obtained after tempering of the test sample at 110° C.:

Shore hardness A _____ 61
Tensile strength, kg. wt./cm.² _____ 356
Elongation at break, percent _____ 718
Tear propagation resistance, kg. wt./cm. _____ 45
Impact elasticity, percent _____ 64

Example 6

(6a) 260 g. of the modified isocyanate B are uniformly stirred into a melt of 500 g. of a polyester of adipic acid and ethylene glycol (OH number 56) which has been heated to 130° C. and the mixture is then heated for another 15 minutes. The reaction mixture is then poured on to an enamelled sheet metal support and rapidly cooled. The solid prepolymer has an NCO content of 80.0%.

(6b) 152 g. of the NCO prepolymer described above are heated to 120° C. and then reacted with 265 g. of the above polyester. The properties of the high grade polyurethane obtained are similar to those described in Example 1.

Example 7

500 g. of a dehydrated polyester of glycol and adipic acid which has an OH number of 56 are reacted with 275 g. of naphthylene-1,5-diisocyanate at 130° C. 0.15 g. of a salt of toluene sulphonic acid and morpholine are added after about 15 minutes and 14.5 g. of tertiary butanol are then added dropwise in the course of ½ hour. The polyester prepolymer which contains urea and biuret groups is obtained when evolution of gas has ceased. This prepolymer can be worked up with another 700 g. of the abovementioned polyester either immediately or at any time later to produce a high grade polyurethane elastomer.

What is claimed is:

1. In a process for the production of cross-linked polyurethane elastomers by reacting a stoichiometric excess of an organic polyisocyanate with an organic dihydroxy compound having a molecular weight of from about 500 to about 6,000 and reacting the prepolymer thus formed with a glycol, of a molecular weight of from 62 to about 500, the improvement which comprises reacting naphthylene-1,5-diisocyanate with an aliphatic or alicyclic tertiary alcohol to yield from about 0.02 to about 0.5 mol of urea or biuret groups per mol of naphthylene diisocyanate incorporating said reacted naphthylene diisocyanate into the organic dihydroxy compound and reacting therewith.

2. The improvement of claim 1 wherein the incorporated modified naphthylene diisocyanate is prepared by reacting naphthylene-1,5-diisocyanate with a tertiary alcohol at a ratio of 1 mol of the diisocyanate per 0.02 to 0.5 mol of the tertiary alcohol at a temperature of 125 to 145° C. and reacting the modified diisocyanate thus formed with the organic dihydroxy compound.

3. The improvement of claim 1 wherein the modified diisocyanate contains 0.1 to 0.25 mol of urea or biuret groups per mol of naphthylene diisocyanate.

4. The improvement of claim 1 wherein the incorporated modified naphthylene diisocyanate is prepared by reacting an excess of naphthylene-1,5-diisocyanate with the organic dihydroxy compound, reacting the prepolymer thus formed with a tertiary alcohol to yield from about 0.02 to about 0.5 mol of urea or biuret groups per mol of naphthylene diisocyanate and reacting the modified prepolymer thus formed with the glycol.

5. The improvement of claim 1 wherein the organic dihydroxy compound having at least two groups reactive with isocyanate groups and a molecular weight of from about 500 to about 6,000 is an hydroxy polyester.

6. The improvement of claim 1 wherein the dihydroxy compound is a polycaprolactone.

7. The product of the process or claim 1.

References Cited
UNITED STATES PATENTS

| | | | |
|---|---|---|---|
| 3,201,372 | 8/1965 | Wagner | 260—77.5 |
| 3,124,605 | 3/1964 | Wagner | 260—453 |
| 2,987,504 | 6/1961 | Wagner | 260—75 |
| 2,683,728 | 7/1954 | Mastin et al. | 260—453 |
| 3,248,373 | 4/1966 | Barringer | 260—77.5 |
| 2,818,404 | 12/1957 | Hill | 260—75 |

DONALD E. CZAJA, Primary Examiner

H. S. COCKERAM, Assistant Examiner

U.S. Cl. X.R.

260—77.5 AN, 77.5 AT